(12) United States Patent
Rogers

(10) Patent No.: US 8,087,731 B1
(45) Date of Patent: Jan. 3, 2012

(54) SIDE DUMP BODY

(76) Inventor: Ralph R. Rogers, Dakota Dunes, SD (US)

( * ) Notice: Subject to any disclaimer, the term of this patent is extended or adjusted under 35 U.S.C. 154(b) by 0 days.

(21) Appl. No.: 12/924,154

(22) Filed: Sep. 22, 2010

(51) Int. Cl.
  *B60P 1/04* (2006.01)
(52) U.S. Cl. .......................................................... 298/18
(58) Field of Classification Search ............... 298/17 R, 298/18, 19 R, 22 R, 22 D
  See application file for complete search history.

(56) References Cited

U.S. PATENT DOCUMENTS

| | | | |
|---|---|---|---|
| 5,480,214 A | 1/1996 | Rogers | |
| 5,513,901 A * | 5/1996 | Smith et al. | 298/22 J |
| 5,845,971 A | 12/1998 | Rogers | |
| 5,967,615 A | 10/1999 | Rogers | |
| 6,056,368 A | 5/2000 | Rogers | |
| 6,089,670 A | 7/2000 | Rogers | |
| 6,179,385 B1 | 1/2001 | Rogers | |
| 6,199,955 B1 | 3/2001 | Rogers | |
| 6,206,477 B1 * | 3/2001 | Rexus et al. | 298/23 MD |
| 6,257,670 B1 | 7/2001 | Rogers | |
| 6,402,453 B1 | 6/2002 | Rogers | |
| 6,425,726 B1 | 7/2002 | Rogers | |
| 6,428,264 B1 | 8/2002 | Rogers | |
| 6,439,668 B1 * | 8/2002 | Hagenbuch et al. | 298/18 |
| 6,520,589 B2 | 2/2003 | Jensen et al. | |
| 7,360,843 B1 | 4/2008 | Rogers | |
| 7,478,883 B1 | 1/2009 | Rogers | |
| 7,611,187 B1 | 11/2009 | Rogers | |
| 7,722,126 B2 | 5/2010 | Rogers | |
| 7,789,467 B2 | 9/2010 | Rogers | |
| 7,819,486 B2 | 10/2010 | Rogers | |
| 7,866,756 B2 * | 1/2011 | Rogers et al. | 298/17.7 |
| 2006/0213701 A1 * | 9/2006 | Durif | 180/24 |
| 2010/0327649 A1 * | 12/2010 | Kvist et al. | 298/19 R |

* cited by examiner

*Primary Examiner* — H Gutman
(74) *Attorney, Agent, or Firm* — Dennis L. Thotme; Thomte Patent Law Office LLC

(57) ABSTRACT

A side dump truck or trailer comprising a wheeled frame having a plurality of side dump bodies pivotally mounted thereon which may be individually moved from a transport position to a side dumping position. Once the side dump body is in its dumping position, the side dump body may be moved somewhat upwardly and inwardly away from the pile of material which has been dumped at one side of the truck or trailer.

4 Claims, 6 Drawing Sheets

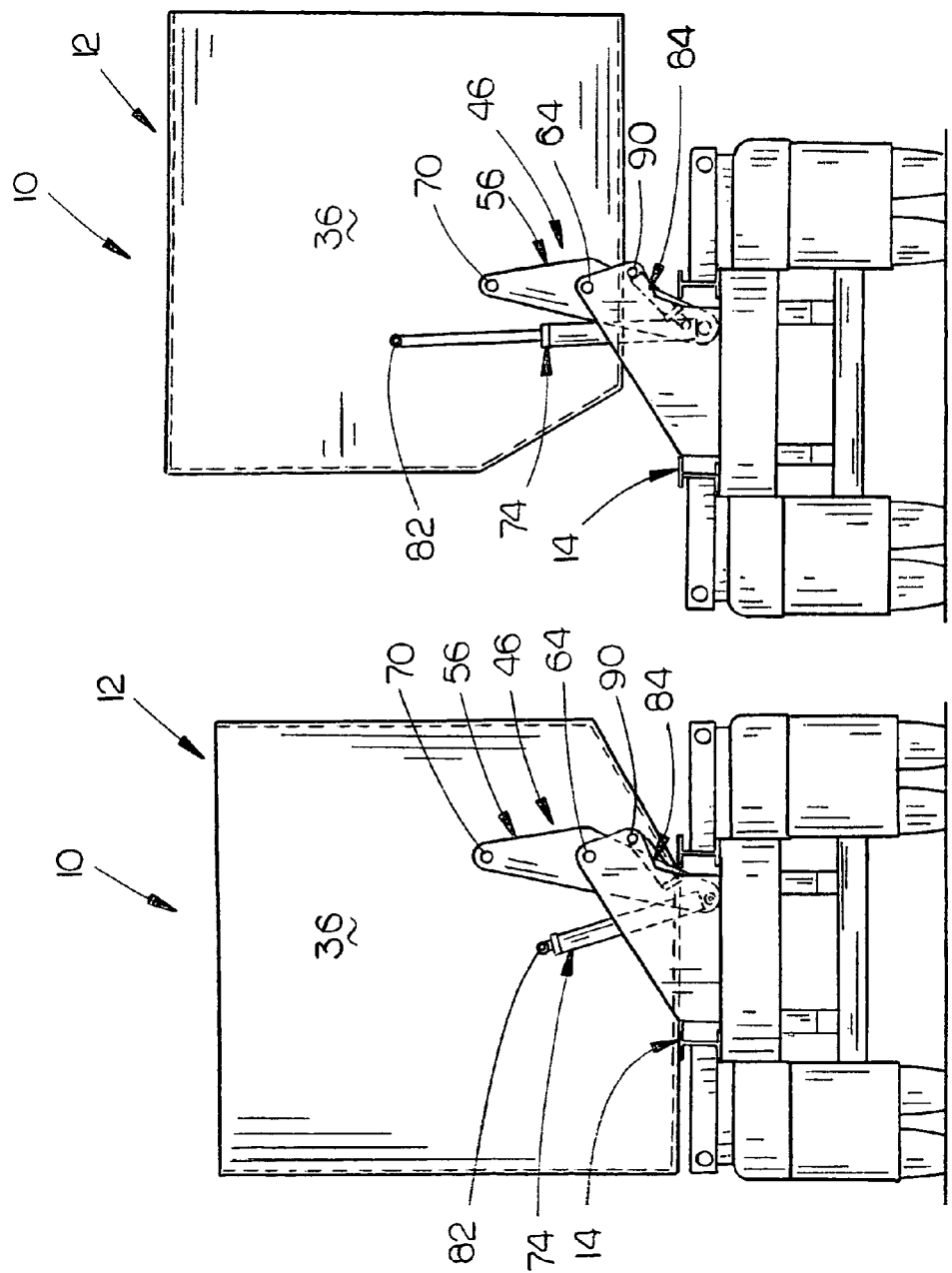

SIDE DUMP BODY

BACKGROUND OF THE INVENTION

1. Field of the Invention

This invention relates to a side dump body and more particularly to a side dump body for use on a trailer or truck and which has increased carrying capacity when compared to conventional side dump trailers. More particularly, this invention relates to a side dump body wherein a plurality of side dump bodies are mounted on a trailer or truck with each of the side dump bodies being selectively pivotally movable between a transport position and a dumping position at one side of the truck or trailer.

2. Description of the Related Art

Dump bodies which are employed on trailers or trucks normally are of the end dump type or the side dump type. Since the introduction of the side dump body disclosed in applicant's U.S. Pat. No. 5,480,214, side dump trucks and trailers have experienced wide acceptance. Perhaps the only drawback to applicant's earlier side dump body is that the body does not have as much carrying capacity as an end dump body due to the fact that the side walls of the side dump body extend upwardly and outwardly from a bottom wall, rather than extending vertically upwardly from a bottom wall as in most conventional end dump bodies. The bottom dump or belly dump bodies also suffer the same drawback, since the side walls of those trailers normally extend upwardly and outwardly from a bottom wall rather than substantially vertically from a bottom wall. A further disadvantage of the conventional side dump and end dump trailers is that they are only able to haul a single commodity.

Applicant overcame the objections noted above to side dump trailers by way of the inventions disclosed in U.S. Pat. Nos. 5,967,615; 6,179,385; 7,360,813 and 7,478,883. Although the side dump bodies of the above-identified patents perform their intended functions in an exceptional manner, it has been found that some of the contents of the side dump bodies, after they have been moved to their dumped position, may sometimes be present in the dumped side body due to the pile of dumped material extending upwardly into the interior of the side dump body. If the truck or trailer is moved forwardly or rearwardly in that condition, the dumped material which is piled along side the truck or trailer may damage the side dump body since the side dump body is normally constructed of light-weight steel or other metal material.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A side dump body is disclosed which has substantially vertically disposed side walls, a bottom wall, a back wall and a front wall to increase the carrying capacity of the body as compared to those side dump bodies having upwardly and outwardly extending side walls. One or more side dump bodies or units may be mounted on a truck or trailer. A first upstanding support is provided at the rear of the side dump body which has upper and lower ends. The lower end of the first support is operatively secured to the frame means of the truck or trailer and extends upwardly therefrom. A second upstanding support is also provided at the front of the side dump body which has upper and lower ends with the lower end thereof being secured to the frame means so as to extend upwardly therefrom in a spaced-apart relationship with respect to the first support.

A first generally upstanding pivot arm, having upper and lower ends, is also provided with the first pivot arm being pivotally secured intermediate its upper and lower ends to the first support adjacent the upper end thereof about a horizontal axis. A second generally upstanding pivot arm is also provided which has upper and lower ends with the second pivot arm being pivotally secured intermediate its upper and lower ends to the second support adjacent the upper end thereof about a horizontal axis. A first hydraulic cylinder having a base end and a rod end is provided with the base end of the first hydraulic cylinder being pivotally secured to the first pivot arm adjacent the lower end thereof about a horizontal axis. The rod end of the first hydraulic cylinder is pivotally secured to the back wall of the side dump body. A second hydraulic cylinder is also provided which has a base end and a rod end with the base end of the second hydraulic cylinder being pivotally secured to the second pivot arm adjacent the lower end thereof about a horizontal axis. The rod end of the second hydraulic cylinder is pivotally secured to the front wall of the side dump body about a horizontal axis.

The upper end of the first pivot arm is pivotally secured, about a horizontal axis, to the back wall of the side dump body. The upper end of the second pivot arm is pivotally secured, about a horizontal axis, to the front wall of the side dump body. A third hydraulic cylinder, having a base end and a rod end, is provided with the rod end of the third hydraulic cylinder being pivotally secured to the first pivot arm above the lower end thereof about a horizontal axis. The base end of the third hydraulic cylinder is pivotally secured to the first support intermediate the upper and lower ends thereof. A fourth hydraulic cylinder is also provided, having a base end and a rod end, with the rod end of the fourth hydraulic cylinder being pivotally secured to the second pivot arm above the lower end thereof about a horizontal axis. The base end of the fourth hydraulic cylinder is pivotally secured to the second support intermediate the upper and lower ends thereof.

Each of the first, second, third and fourth cylinders are movable between a retracted and extended position. The first, second, third and fourth cylinders are in their retracted positions when the side dump body is in its transport position. The extension of the first and second cylinders causes the side dump body to be pivotally moved from its transport position to a first dumping stage. The extension of the third and fourth cylinders, when the side dump body is in its first dumping stage, causes the dump body to be pivotally moved to a second dumping stage. The retraction of the third and fourth cylinders, when the side dump body is in its second dumping stage, causes the side dump body to be pivotally moved to a complete dumping stage. The retraction of the third and fourth cylinders, when the side dump body is in its second dumping stage, causing the side dump body to be pivotally moved to a complete dumping stage so that the side dump body is moved upwardly and inwardly with respect to the pile of material which has been dumped alongside the truck or trailer. The retraction of the first and second cylinders, when the side dump body is in its complete dumping stage, causes the side dump body to be pivotally moved to its transport position.

It is therefore a principal object of the invention to provide an improved side dump body for use on a truck or trailer.

Still another object of the invention is to provide a side dump body having an increased carrying capacity when compared to conventional side dump bodies.

Yet another object of the invention is to provide a side dump body which is stable during use.

Still another object of the invention is to provide a side dump truck or trailer wherein a plurality of side dump bodies are individually selectively pivotally secured to the frame means of the truck or trailer.

Yet another object of the invention is to provide a side dump trailer which may be moved upwardly and inwardly with respect to the pile of material which has been dumped by the side dump body so that the side dump body will not engage the pile, thereby preventing damage to the side dump body if the truck or trailer is moved forwardly or rearwardly after the contents have been dumped therefrom.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 is a rear view illustrating the side dump unit in its transport position;

FIG. 6 is a view similar to FIG. 5 except that the side dump unit has been moved to a first dumping position;

DESCRIPTION OF THE PREFERRED EMBODIMENT

Figure 1:
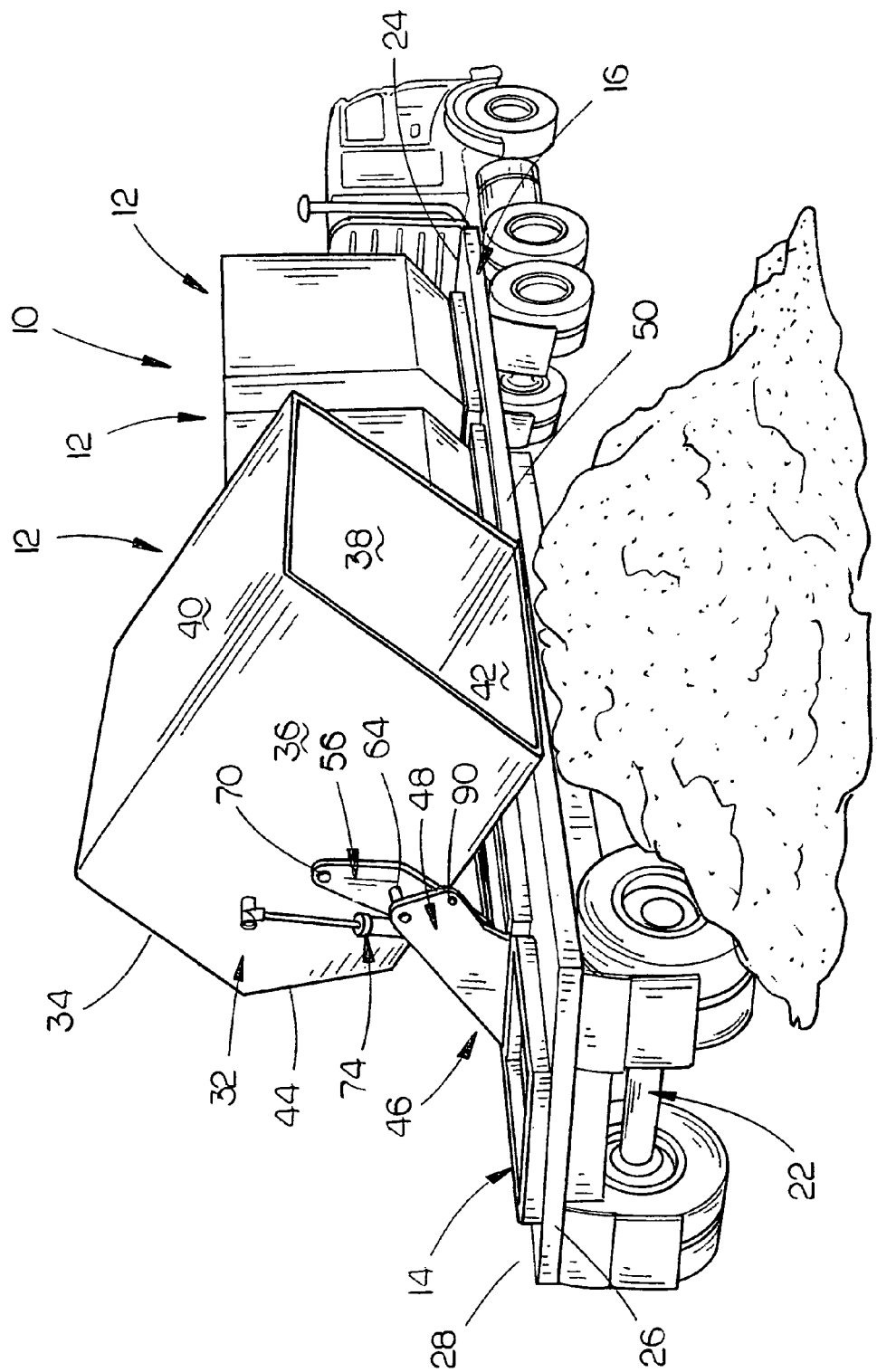
FIG. 1 is a rear perspective view of the side dump body of this invention illustrating one of the side dump units in its dumped position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The side dump body of this invention is referred to generally by the reference numeral 10 and comprises one or more side dump bodies or units mounted on a frame means 14 which may be incorporated into a trailer or into what is commonly called a straight truck. While the drawings illustrate a side dump body 10 mounted on a trailer 16, the side dump body can also be mounted on a truck as described.

Frame means 14 normally comprises a pair of longitudinally extending frame members 18 and 20 which are conventionally supported on a running gear 22. For purposes of description, the frame means 14 will be described as including a forward end 24, rearward end 26, and opposite sides 28 and 30. Inasmuch as each of the side dump bodies or units 12 are identical, only a single side dump body 12 will be described. Side dump body 12 includes a tub 32 including a bottom wall 34, rear wall 36, front wall 38, and side walls 40 and 42. A short tapered wall portion 44 is provided between bottom wall 34 and side wall 42, as seen in the drawings, for a purpose to be described hereinafter.

Figure 2:
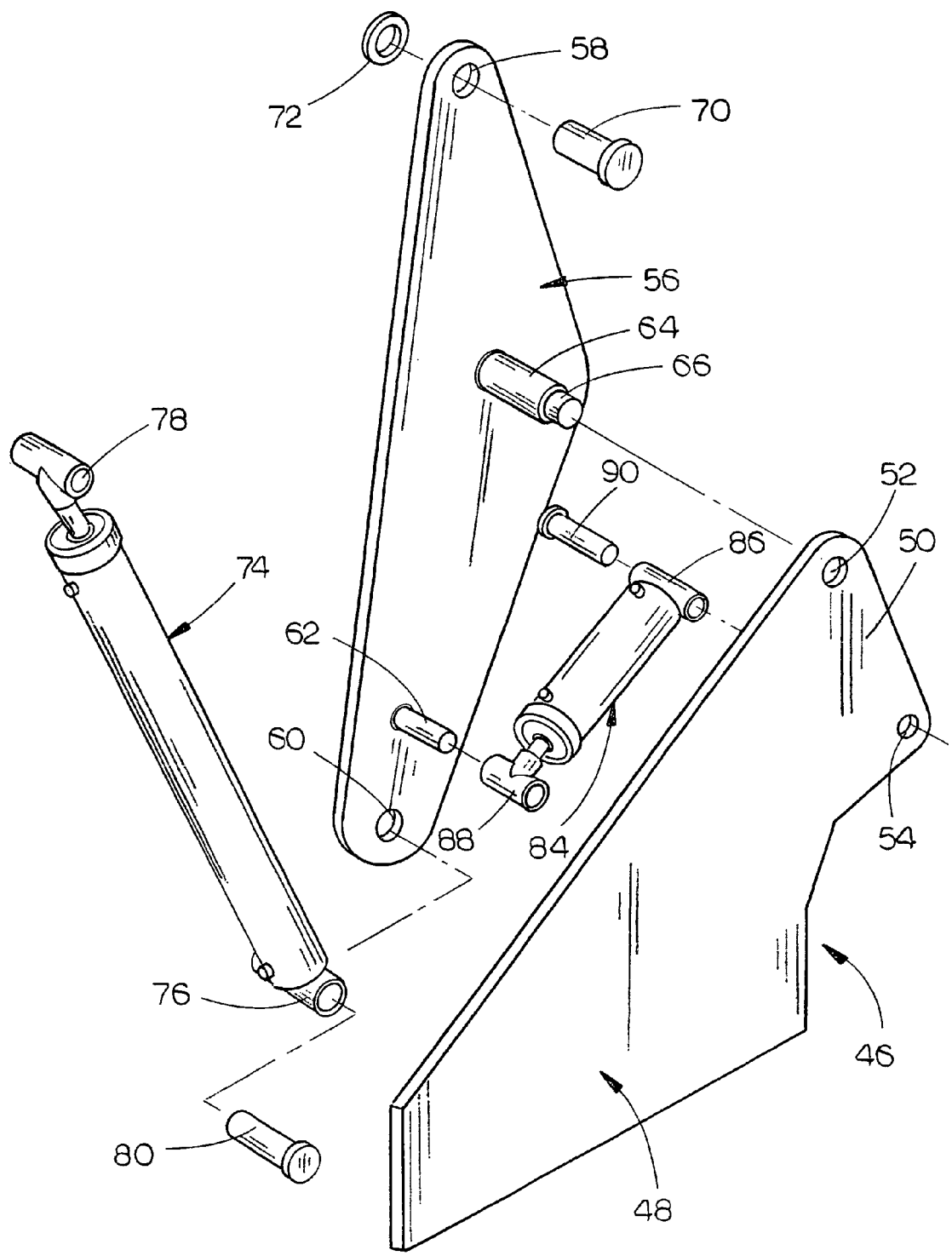
FIG. 2 is an exploded perspective view of the structure at the rear of one of the side dump units which pivotally move the side dump unit.

A first tub pivot assembly 46 is secured to the frame means 14 at the rearward end of tub 32 while a second tub pivot assembly 46' is secured to the frame means 14 at the forward end of the tub 32. Inasmuch as second tub pivot assembly 46' is identical to first tub pivot assembly 46, only the first tub pivot assembly 46 will be described in detail with "'" indicating identical structure on the second pivot tub assembly 46'. Tub pivot assembly 46 includes an upstanding support, plate or carriage which is bolted or welded to the frame means 14. Support 48 includes a laterally extending portion 50 having an opening 52 formed in its upper end and an opening 54 formed in its lower end. Tub pivot assembly 46 also includes a pivot arm having an opening 58 formed in one end thereof and an opening 60 formed in its other end. Pin 62 is secured to pivot arm 56 above opening 60 as seen in FIG. 2. A pin 64 is secured to pivot arm 56 intermediate the ends thereof. Pin 64 has a reduced diameter portion 66 which is received in opening 52 and secured therein by any convenient means such as a locking key or pin. Rear wall 36 of body 32 has an opening 68 formed therein which receives the inner end of a pivot pin 70 which extends through opening 58 in pivot arm 56. A spacer washer 72 embraces pin 70 between pivot arm 56 and rear wall 36. The pin 70 is maintained in the opening 68 by any conventional means.

The numeral 74 refers to an elongated hydraulic cylinder having a base end 76 and a rod end 78. The base end 76 of cylinder 74 is pivotally secured to pivot arm 56 by pin 80 extending through base end 76 of cylinder 74 and through the opening 60 in pivot arm 56. Pin 80 is maintained in position by any convenient means. The rod end 78 of cylinder 74 is pivotally secured to rear wall 36 of body 32 by means of pin 82 extending through rod end 78 and through an opening formed in back wall 36. Pin 82 is maintained in position by any convenient means.

The numeral 84 refers to a hydraulic cylinder having a base end 86 and a rod end 88. Pin 90 extends through base end 86 of cylinder 84 and through opening 54 in support 48 and is maintained therein by any convenient means. The rod end 88 of cylinder 84 is pivotally mounted on the pin 62 which extends from pivot arm 56 and is maintained thereon by any convenient means.

Figure 3:
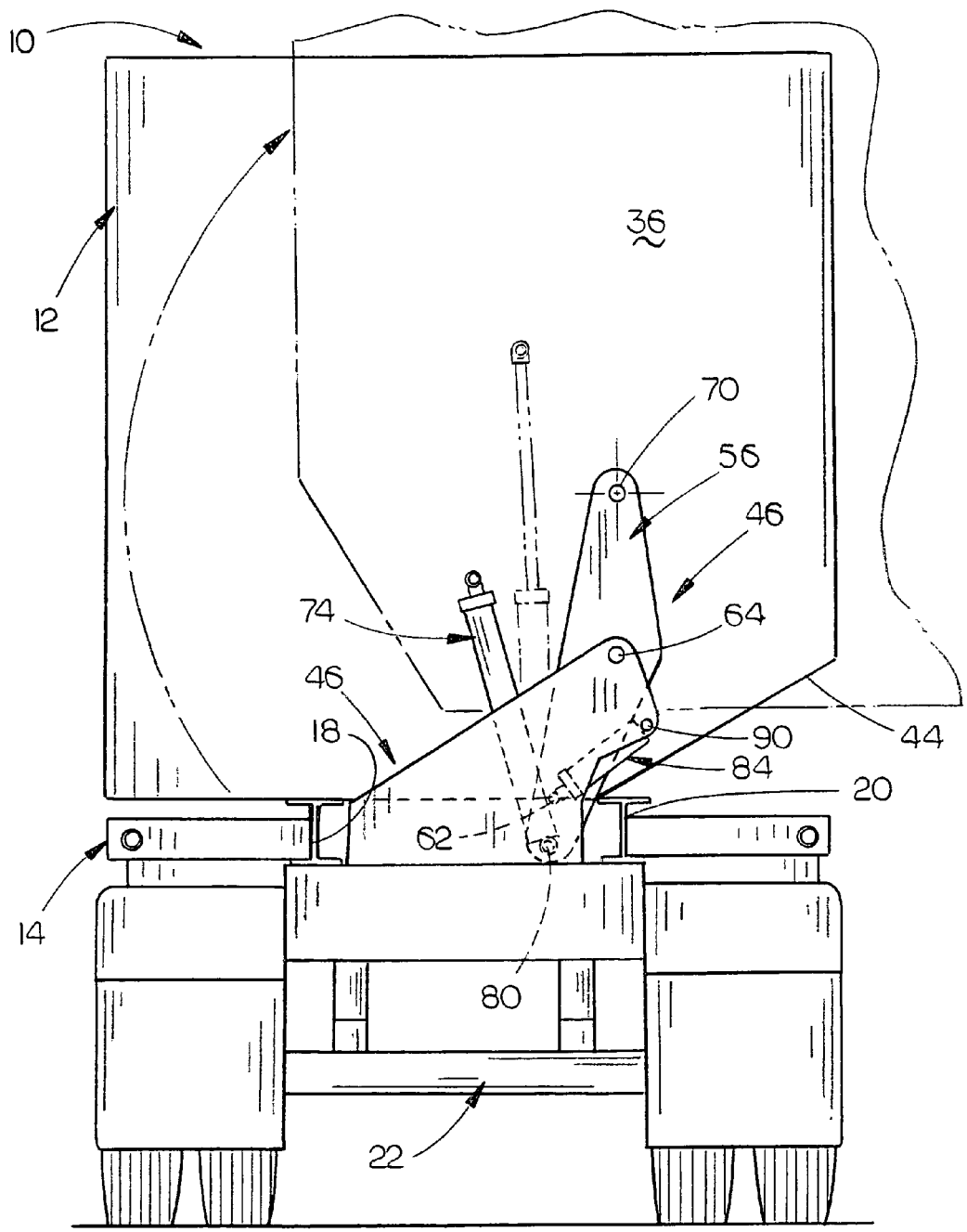
FIG. 3 is a rear view of the side dump body of this invention with the broken lines illustrating the side dump unit in a first dumping position.
Figure 4:
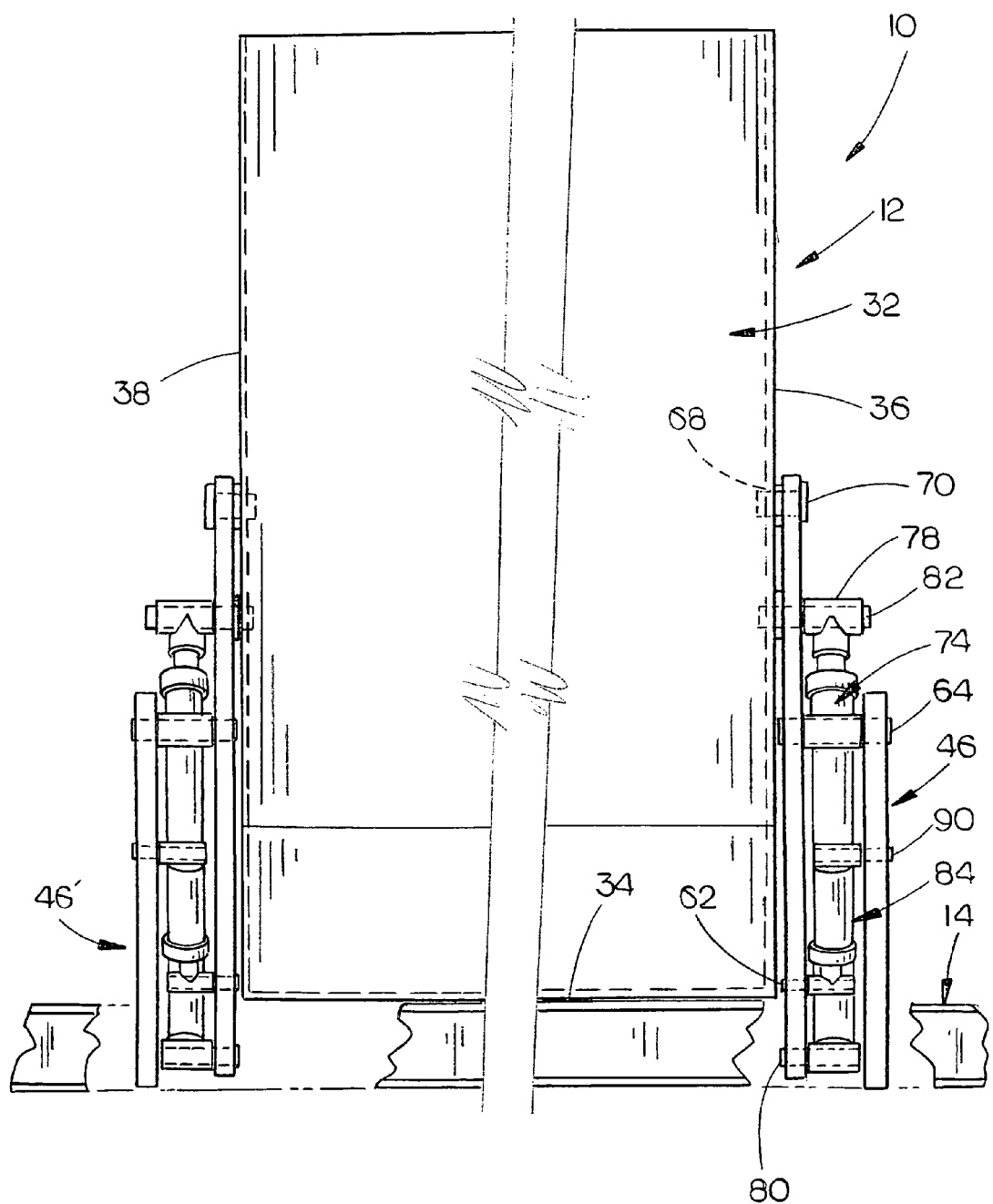
FIG. 4 is a partial side view of the side dump unit which illustrates the structure at the rear of the side dump unit and at the forward end of the side dump unit for pivotally moving the side dump unit.
Figures 7, 8:
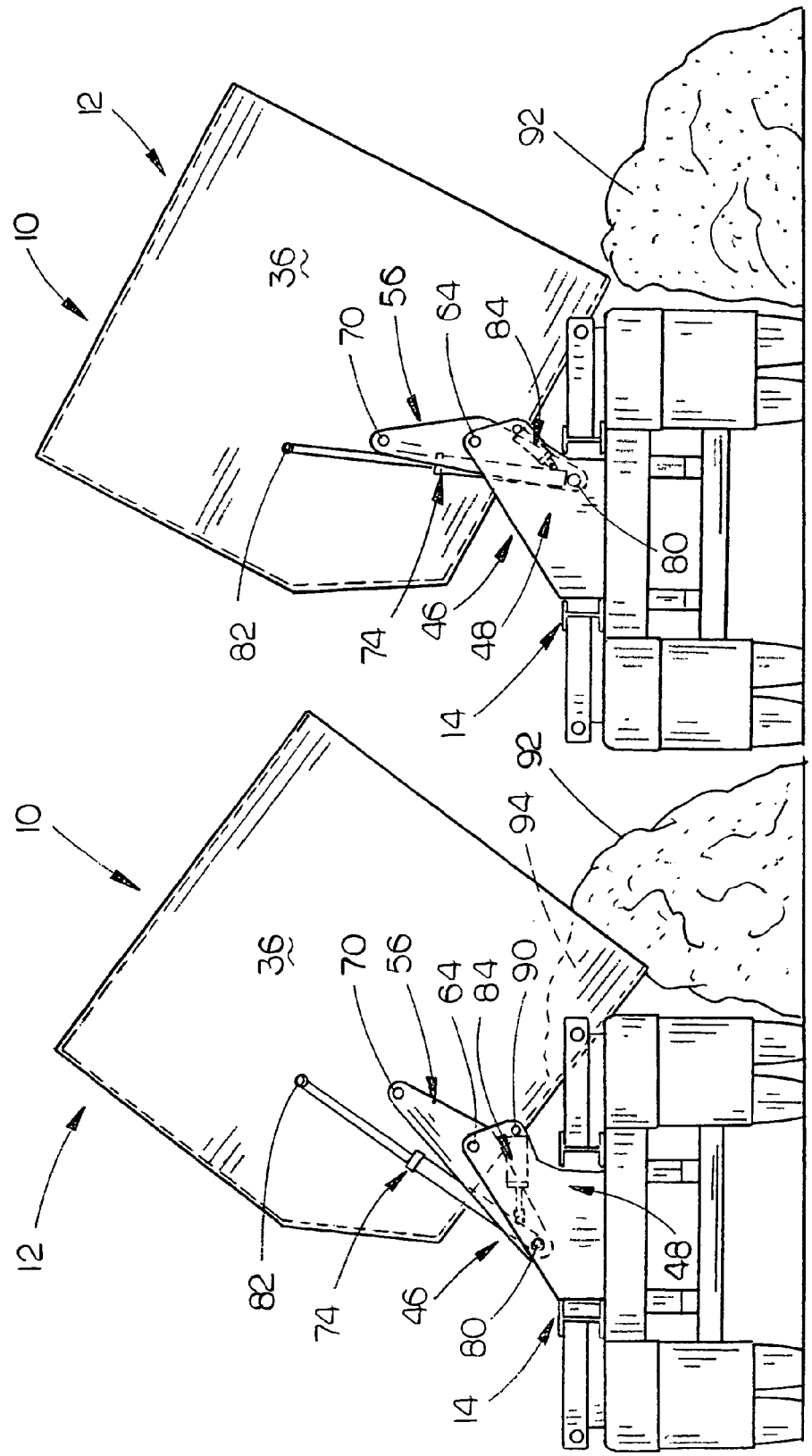
FIG. 7 is a view similar to FIGS. 5 and 6 except that the side dump unit has been pivotally moved to its second dumping position.
FIG. 8 is a view similar to FIGS. 5-7 except that the side dump unit has been pivotally moved from the position of FIG. 7 to a complete dumping position.

When the side dump body 12 is positioned on the truck or trailer in a transport position as seen in FIG. 3, the hydraulic cylinders 74 and 84 are in their retracted position. In that position, pin 70 located directly above pin 64 with pins 70 and 64 being positioned directly over frame member 20. When it is desired to pivot the side dump body 12 to dump the contents therefrom, the side dump body 12 is initially moved from the position of FIG. 5 to the first dumping stage as seen in FIG. 6 by extending hydraulic cylinder 74 which causes the side dump body 12 to pivot about pin 70. The side dump body 12 is then pivoted from the first dumping stage of FIG. 6 to the second dumping stage of FIG. 7 by extending hydraulic cylinder 84 which causes pivot arm 56 to pivot about pin 64 with the base end of hydraulic cylinder 74 pivoting about pin 80. The contents or material 92 is then dumped from the side dump body 12 as seen in FIG. 7. Contents of the material 94 which may still be present in the lower portion of the side dump body 12 as seen in FIG. 7 is illustrated by broken lines.

If the truck or trailer would move either forwardly or rearwardly, the material could cause damage to the side dump body since it is constructed of a light steel material. To prevent that situation from occurring, the hydraulic cylinder 84 is retracted from the position of FIG. 7 to the complete dumping stage or position of FIG. 8 which causes the side dump body 12 to move upwardly and inwardly since the retraction of the rod of hydraulic cylinder 84 pulls the lower end of pivot arm 56 to the right as viewed in FIG. 8 which causes the movement of the side dump body from the position of FIG. 7 to the position of FIG. 8 so that no contents remain within the side dump body 12. The side dump body 12 may then be moved from the complete dumping station illustrated in FIG. 8 to its transport position of FIG. 5 by retracting the hydraulic cylinder 74 which causes the side dump body 12 to pivotally move to its transport position. The small angled wall portion 44 provides sufficient clearance with respect to the frame of the vehicle so that the side dump body may pivot from the position of FIG. 5 to the position of FIG. 6 without striking any portions of the frame of the truck or trailer. The above described operation of the tub pivot assembly 46 is simultaneously duplicated in the tub pivot assembly 46'.

Thus it can be seen that a novel side dump body has been provided which accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
a wheeled frame means having a rearward end, a forward end, and first and second sides;
a first upstanding support having upper and lower ends;
said first support being operatively secured at its said lower end to said frame means and extending upwardly therefrom;
a second upstanding support having upper and lower ends;
said second support being operatively secured at its said lower end to said frame means and extending upwardly therefrom in a spaced-apart relationship with respect to said support;
a first, generally upstanding, pivot arm having upper and lower ends;
said first pivot arm being pivotally secured intermediate its upper and lower ends to said first support adjacent said upper end thereof about a horizontal axis;
a second, generally upstanding, pivot arm having upper and lower ends;
said second pivot arm being pivotally secured intermediate its upper and lower ends to said second support adjacent said upper end thereof, about a horizontal axis;
a first hydraulic cylinder having a base end and a rod end;
said base end of said first hydraulic cylinder being pivotally secured to said first support adjacent said lower end thereof about a horizontal axis;
said rod end of said first hydraulic cylinder being pivotally secured to said back wall of said side dump body about a horizontal axis;
a second hydraulic cylinder having a base end and a rod end;
said base end of said second hydraulic cylinder being pivotally secured to said second support adjacent said lower end thereof about a horizontal axis;
said rod end of said second hydraulic cylinder being pivotally secured to said front wall of said dump body about a horizontal axis;
a dump body positioned between said first and second pivot arms and being movable from a transport position to a first dumping stage, a second dumping stage and a complete dumping stage;
said dump body including a front wall, a back wall, a bottom wall, and first and second side walls;
said upper end of said first pivot arm being pivotally secured, about a horizontal axis, to said back wall of said dump body;
said upper end of said second pivot arm being pivotally secured, about a horizontal axis, to said front wall of said dump body;
a third hydraulic cylinder having a base end and a rod end;
said rod end of said third hydraulic cylinder being pivotally secured to said first pivot arm above said lower end thereof about a horizontal axis;
said base end of said third hydraulic cylinder being pivotally secured to said first support below said upper end thereof about a horizontal axis;
a fourth hydraulic cylinder having a base end and a rod end;
said rod end of said fourth hydraulic cylinder being pivotally secured to said second pivot arm above said lower end thereof about a horizontal axis;
said base end of said fourth hydraulic cylinder being pivotally secured to said second support below said upper end thereof about a horizontal axis;
said first, second, third and fourth cylinders being movable between retracted and extended positions;
said first, second, third and fourth cylinders being in their retracted positions when said dump body is in its said transport position;
the extension of said first and second cylinders causing said dump body to be pivotally moved to a first dumping stage;
the extension of said third and fourth cylinders, when said dump body is in its said first dumping stage, causing said dump body to be pivotally moved to a second dumping stage;
the retraction of said third and fourth cylinders, when said dump body is in its said second dumping stage, causing said dump body to be pivotally moved to a complete dumping stage;
the retraction of said first and second cylinders, when said dump body is in its said complete dumping stage, causing said dump body to be pivotally moved to said transport position.

2. The combination of claim 1 wherein said first and second side walls are substantially vertically disposed when said dump body is in its said transport position and wherein said first and second side walls are substantially horizontally disposed when said dump body is in its said first dumping stage.

3. The combination of claim 2 wherein said first and second side walls are disposed at a first angle from horizontal when said dump body is in its said second dumping stage and wherein said first and second side walls are disposed at a second angle from horizontal when said dump body is in its said complete dumping stage.

4. The combination of claim 3 wherein said second angle from horizontal is less than said first angle from horizontal.

* * * * *